United States Patent
Zhu et al.

(10) Patent No.: US 9,426,820 B2
(45) Date of Patent: Aug. 23, 2016

(54) MULTI-CARRIER TERMINAL SCHEDULING METHOD AND CHANNEL QUALITY INFORMATION SENDING METHOD AND SYSTEM

(75) Inventors: Yun Zhu, Shenzhen (CN); Chun Huang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 185 days.

(21) Appl. No.: 14/127,732

(22) PCT Filed: Sep. 30, 2011

(86) PCT No.: PCT/CN2011/080411
§ 371 (c)(1),
(2), (4) Date: Dec. 19, 2013

(87) PCT Pub. No.: WO2012/174806
PCT Pub. Date: Dec. 27, 2012

(65) Prior Publication Data
US 2014/0119318 A1  May 1, 2014

(30) Foreign Application Priority Data
Jun. 20, 2011 (CN) .......................... 2011 1 0166108

(51) Int. Cl.
*H04L 5/00* (2006.01)
*H04W 74/08* (2009.01)
*H04W 72/12* (2009.01)

(52) U.S. Cl.
CPC ......... *H04W 72/1284* (2013.01); *H04L 5/0053* (2013.01); *H04W 74/0833* (2013.01); *H04W 74/0866* (2013.01)

(58) Field of Classification Search
CPC .... H04B 17/327; H04B 7/216; H04B 7/2628; H04W 80/04; H04W 72/14; H04W 52/365; H04W 72/0473; H04W 72/042; H04W 72/0413; H04W 52/48; H04W 52/50; H04W 72/12

USPC ......................................... 370/329
See application file for complete search history.

(56) References Cited

U.S. PATENT DOCUMENTS

2010/0297993 A1* 11/2010 Heo et al. ................. 455/423
2011/0158118 A1* 6/2011 Chou ................. H04L 27/2601
370/252

(Continued)

FOREIGN PATENT DOCUMENTS

| CN | 101141779 | 3/2008 |
|----|-----------|--------|
| CN | 101370245 | 2/2009 |

(Continued)

OTHER PUBLICATIONS

International Search Report for PCT/CN2011/080411, English Translation attached to original, Both Completed by the Chinese Patent Office on Mar. 6, 2012, All together 7 Pages.

(Continued)

*Primary Examiner* — Redentor Pasia
*Assistant Examiner* — Peter Mak
(74) *Attorney, Agent, or Firm* — Brooks Kushman P.C.

(57) ABSTRACT

A multi-carrier terminal scheduling method and system are provided. The method includes, when accessing a network in an uplink, a multi-carrier terminal sending an uplink access request to a base station through an Enhanced Dedicated Channel Random Access Uplink Control Channel (E-RUCCH) over a carrier where a main frequency point selected by a wireless network controller for the multi-carrier terminal is located, and the base station scheduling the multi-carrier terminal through an Enhanced Dedicated Channel Absolute Grant Channel (E-AGCH). The system includes an access request transmission module located in the multi-carrier terminal and a scheduling module located in the base station for use in performing the method.

7 Claims, 1 Drawing Sheet

(56) References Cited

U.S. PATENT DOCUMENTS

| | | | |
|---|---|---|---|
| 2012/0002630 A1 | 1/2012 | Bergman et al. | |
| 2012/0026963 A1* | 2/2012 | Kim | H04L 1/1812 370/329 |
| 2012/0213189 A1* | 8/2012 | Choi | H04W 72/1231 370/329 |
| 2014/0056239 A1* | 2/2014 | Zhang | H04W 52/146 370/329 |

FOREIGN PATENT DOCUMENTS

| | | | | |
|---|---|---|---|---|
| CN | EP 2173109 A1 * | 4/2010 | | H04W 74/004 |
| CN | EP 2178224 A1 * | 4/2010 | | H04L 1/18 |
| CN | 101860962 | 10/2010 | | |
| CN | 101959234 | 1/2011 | | |
| CN | 101965018 | 2/2011 | | |
| EP | 2173109 | 4/2010 | | |
| EP | 2173109 A1 * | 4/2010 | | |
| EP | 2178224 A1 * | 4/2010 | | |
| WO | 2011046498 | 4/2011 | | |

OTHER PUBLICATIONS

Extended European Search Report for European Application No. 11868251.7, Completed by the European Patent Office Dated Nov. 18, 2014, 11 Pages.

ZTE 3GPP TSG RAN WG2 Meeting No. 70bis, Stockholm, Sweden Jun. 28-Jul. 2, 2010, 2 Pages, XP 050451075, "Discussion on SI structure for 1.28M TDD MC-HSUPA."

ZTE 3GPP TSG RAN WG2 Meeting No. 70, Montreal, Canada May 10-14, 2010, 2 Pages, XP 050423087, "Discussion on SI structure for 1.28M TDD MC-HSUPA."

European Patent Office, European Search Report for corresponding European Application No. 11 868 251.7 mailed Jul. 30, 2015.

TD Tech, Consideration on E-RUCCH configuration for LCR MC-HSUPA, R2-103952, 3GPP TSG-RAN WG2#70bis, Agenda item: 10.1.3.5, Stockholm, Jun. 28-Jul. 2, 2010.

* cited by examiner

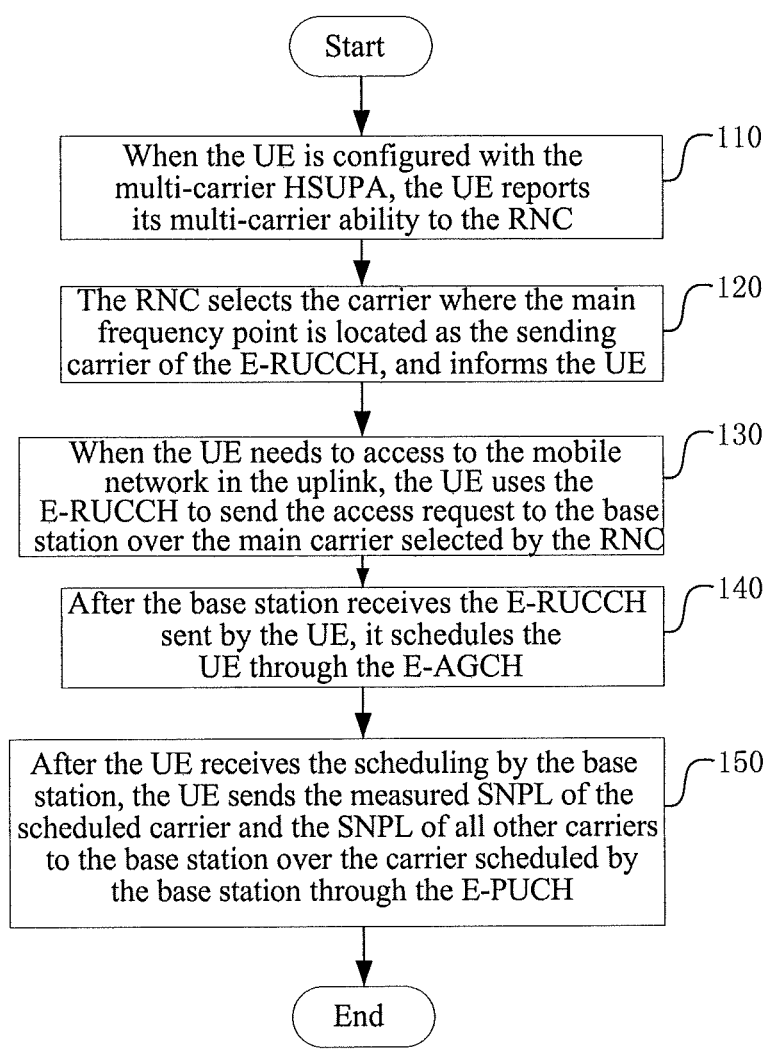

MULTI-CARRIER TERMINAL SCHEDULING METHOD AND CHANNEL QUALITY INFORMATION SENDING METHOD AND SYSTEM

CROSS-REFERENCE TO RELATED APPLICATION

This application is the U.S. national phase of PCT Appln. No. PCT/CN2011/080411 filed Sep. 30, 2011 which claims priority to Chinese Application No. 201110166108.4 filed Jun. 20, 2011, the disclosures of which are incorporated in their entirety by reference herein.

TECHNICAL FIELD

The present document relates to the mobile communication field, and in particular, to a multi-carrier terminal scheduling method, a method and system for transmitting signal quality information.

BACKGROUND OF THE RELATED ART

With the constant growth of the mobile data service, the requirement for the wireless data communication with high data rate and high system capacity arises constantly, and also the wireless system itself is required to be suitable for some characteristics of transmitting the data service at the same time, such as, high throughput, high sudden, high reliability, etc. Therefore, the 3gpp introduces the high speed uplink access technology (HSUPA) beginning with the R8 version. Its main technology enhancements include: introducing higher-order modulation mode (16QAM, even 64QAM), introducing Hybrid Automatic Repeat Request (HARQ), and introducing the technology of fast scheduling controlled by the NodeB etc. Accordingly, the HSUPA newly adds some transmission channels and physical channels.

The newly-added transmission channels include:
enhanced dedicated channel (E-DCH): used for bearing the uplink enhancement data, and mapping to the physical channel E-PUCH;
E-DCH uplink control channel (E-UCCH): used for bearing the relevant signaling required by the E-DCH decoding, such as, a transmission block size, a retransmission serial number and an HARQ process number, etc.

The newly-added physical channels include:
E-DCH random access uplink control channel (E-RUCCH): used for bearing the scheduling information and the radio network temporary identity (E-RNTI) of the UE;
E-DCH absolute grant channel (E-AGCH): used for bearing the scheduling information of the base station, specifically including the power and the configuration of the physical resources, etc.;
E-DCH physical uplink channel (E-PUCH): these two transmission channels, the E-DCH and the E-UCCH, are multiplexed together and mapped to the E-PUCH;
E-DCH HARQ acknowledgement indication channel (E-HICH): used for bearing the HARQ acknowledgement message ACK/NACK.

Wherein, the E-RUCCH and the E-PUCH are physical uplink channels; the E-AGCH and the E-HICH are physical downlink channels.

Through introducing the enhanced technology of the HSUPA, the peak transmission rate of the uplink data packet is increased notably, the throughput of the uplink data is increased notably, meanwhile, the transmission delay of the data package is decreased and the frame error rate is reduced, the performance of the uplink dedicated or shared transmission channel is improved, thus supporting better the data services, such as, visual telephone, multimedia, E-mail, tele-processing, game, VID, etc.

But there is no end for the technical development, after the single carrier HSUPA, how to apply these above-mentioned enhanced technologies to the multi-carrier HSUPA, for example, how to configure the above-mentioned physical channel newly introduced during the HSUPA stage in the case of multiple carriers, is a newly produced problem.

In the single carrier HSUPA version, the E-RUCCH physical channel bears the scheduling information of the UE and the radio network temporary identity E-RNTI of the UE, and the UE uses the E-RUCCH to request for granted resources from the network side at the same time; the UE obtains the granted resources through the E-AGCH channel, and the UE and the network side set and use the HARQ process on the E-HICH channel after obtaining the resources to guarantee the reliable transmission of the data with each other, that is to say, in the single carrier scene, the channels such as the E-RUCCH and the E-PUCH/E-HICH/E-AGCH, etc. are always over the same carrier. But for multiple carriers, how to configure the above-mentioned channels among the multiple carriers to enable the terminal to realize accessing the network and the data transmission successfully is still a problem worth studying, and whether the data format on the channel needs to be re-designed is a problem thought by people.

SUMMARY OF THE INVENTION

The technical problem that the present document requires to solve is to provide a multi-carrier terminal scheduling method and system, to enable the multi-carrier terminal to access the mobile network smoothly.

In order to solve the above-mentioned problem, the present document provides a multi-carrier terminal scheduling method, comprising:

when accessing a network in an uplink, a multi-carrier terminal sending an uplink access request to a base station through an Enhanced Dedicated Channel Random Access Uplink Control Channel (E-RUCCH) over a carrier where a main frequency point selected by a wireless network controller for the multi-carrier terminal is located; and the base station scheduling the multi-carrier terminal through an Enhanced Dedicated Channel Absolute Grant Channel (E-AGCH).

Preferably, the step of the base station scheduling the multi-carrier terminal through the E-AGCH comprises:

when the base station schedules the multi-carrier terminal, selecting some or all carriers supported by the multi-carrier terminal for scheduling, and sending authorization information to the multi-carrier terminal through the E-AGCH over the scheduled carrier; and after the multi-carrier terminal receives the authorization information sent by the base station, sending a serving and neighbor cell path loss (SNPL) value of the scheduled carrier and SNPL values of other carriers measured by the present terminal to the base station over the scheduled carrier through an enhanced dedicated channel physical uplink channel (E-PUCH).

Preferably, when the base station schedules the multi-carrier terminal for a first time, the authorization information is configured by the base station using a default value of the SNPL; and when the base station schedules the multi-carrier terminal again after scheduling for the first time, the authorization information is configured by the base station using the measured SNPL value of the scheduled carrier and the SNPL values of other carriers sent by the multi-carrier terminal.

Preferably, the step of sending the SNPL value of the scheduled carrier and the SNPL values of other carriers measured by the present terminal to the base station over the scheduled carrier through the E-PUCH comprises:

the multi-carrier terminal placing the measured SNPL value of the scheduled carrier and the SNPL values of other carriers into scheduling information (SI) of the E-PUCH, wherein, the SI comprises the SNPL value of the scheduled carrier and SNPL information of other carriers, and the SNPL information of other carriers comprises: a carrier index used for indicating the carriers, and the SNPL values of the carriers indicated in the carrier index.

Preferably, in the SI, the SNPL of the scheduled carrier takes up 5 bits, the SNPL information of other carriers takes up no more than 30 bits, the carrier index in the SNPL information of other carriers takes up 5 bits, and the SNPL value of each carrier indicated in the carrier index takes up 5 bits.

Preferably, after the base station schedules the multi-carrier terminal through the E-AGCH, the method further comprises:

in a service data interaction process of the base station and the multi-carrier terminal, transmitting a hybrid automatic retransmission (HARQ) information on an enhanced dedicated channel hybrid automatic retransmission acknowledgement indication channel (E-HICH), wherein, the-HICH and the E-PUCH locates in the same carrier.

A multi-carrier terminal method for transmitting quality information comprises:

the multi-carrier terminal sending a serving and neighbor cell path loss (SNPL) value of a scheduled carrier and SNPL values of other carriers measured by the present multi-carrier terminal to a base station through an enhanced dedicated channel physical uplink channel (E-PUCH) over a carrier scheduled by the base station at regular intervals, wherein, the SNPL of the scheduled carrier and the SNPL values of other carriers are placed in scheduling information (SI) of the E-PUCH.

Preferably, the SI comprises the SNPL value of the scheduled carrier and SNPL information of other carriers, and the SNPL information of other carriers comprises: a carrier index used for indicating the carriers, and SNPL values of the carriers indicated in the carrier index.

A multi-carrier terminal scheduling system comprises an access request transmission module and a scheduling module, wherein, the access request transmission module is located in the multi-carrier terminal, and configured to: when the multi-carrier terminal accesses a network in an uplink, send an uplink access request to a base station through an Enhanced Dedicated Channel Random Access Uplink Control Channel (E-RUCCH) over a carrier where a main frequency point selected by a wireless network controller for the multi-carrier terminal is located; and the scheduling module is located in the base station, and configured to schedule the multi-carrier terminal through an Enhanced Dedicated Channel Absolute Grant Channel (E-AGCH).

Preferably, the scheduling module is configured to schedule the multi-carrier terminal through the E-AGCH by means of: when scheduling the multi-carrier terminal, selecting some or all carriers supported by the multi-carrier terminal for scheduling, and sending authorization information to the multi-carrier terminal through the E-AGCH over the scheduled carrier; and the system further comprises a signal quality information transmission module located in the terminal, configured to: after receiving the authorization information sent by the base station, send a serving and neighbor cell path loss (SNPL) value of the scheduled carrier and SNPL values of other carriers measured by the present terminal to the base station over the scheduled carrier through an enhanced dedicated channel physical uplink channel (E-PUCH).

Preferably, the system further comprises an authorization information configuration module located in the base station, configured to:

configure the authorization information by using a default value of the SNPL when the base station schedules the multi-carrier terminal for a first time; and configure the authorization information by using the SNPL value of the scheduled carrier and the SNPL values of other carriers measured by the multi-carrier terminal sent by the multi-carrier terminal when the base station schedules the multi-carrier terminal again after scheduling for the first time.

Preferably, the signal quality information transmission module is configured to send the SNPL value of the scheduled carrier and the SNPL values of other carriers measured by the present terminal to the base station over the scheduled carrier through the E-PUCH by means of:

placing the SNPL value of the scheduled carrier and the SNPL values of other carriers into scheduling information (SI) of the E-PUCH, wherein, the SI comprises the SNPL value of the scheduled carrier and SNPL information of other carriers, and the SNPL information of other carriers comprises: a carrier index used for indicating the carriers, and the SNPL values of the carriers indicated in the carrier index.

Preferably, the system further comprises a hybrid automatic retransmission (HARQ) information transmission module located in the terminal, configured to: in a service data interaction process with the base station, transmit the HARQ information on an enhanced dedicated channel hybrid automatic retransmission acknowledgement indication channel (E-HICH), wherein, the-HICH and the E-PUCH locates in the same carrier.

A multi-carrier terminal signal quality information transmission system comprises a measurement module and a transmission module, wherein:

the measurement module is configured to measure a serving and neighbor cell path loss (SNPL) value of a carrier scheduled by a base station and SNPL values of other carriers; and the transmission module is configured to send the SNPL value of the scheduled carrier and the SNPL values of other carriers measured by the measurement module to the base station through an enhanced dedicated channel physical uplink channel (E-PUCH) on a carrier scheduled by the base station at regular intervals, wherein, the SNPL of the scheduled carrier and the SNPL values of other carriers are placed in scheduling information (SI) of the E-PUCH.

Preferably, the SI comprises the SNPL value of the scheduled carrier and SNPL information of other carriers, and the SNPL information of other carriers comprises: a carrier index used for indicating the carriers, and SNPL values of the carriers indicated in the carrier index.

By adopting the above-mentioned scheduling method and system, the multi-carrier terminal is enabled to access the mobile network smoothly; and by adopting the method and system for transmitting signal quality information of the present document, the network side is enabled to know the signal quality information of every carrier of the multi-carrier terminal, so the network side sets the transmission parameters of the related data for the multi-carrier terminal, thus performing the data transmission.

BRIEF DESCRIPTION OF DRAWINGS

The accompanying drawings are used to provide further understanding for the present document and constitute a part of the present application, and used to explain the present document together with the embodiments of the present document, rather than constituting an inappropriate limitation to the present document. Wherein:

FIG. 1 is a flow chart of embodiment one.

PREFERRED EMBODIMENTS OF THE INVENTION

The present document is described in detail with reference to the accompanying drawings and in combination with embodiments hereinafter. It should be illustrated that, in the case of not conflicting, the embodiments in the present application and features in these embodiments can be combined with each other.

Embodiment 1 the present embodiment describes how to perform the E-RUCCH transmission and how the network side schedules the multi-carrier terminal when the UE works at multiple carrier frequencies simultaneously, including: when accessing a network in an uplink, the multi-carrier terminal sending an uplink access request to the base station through the E-RUCCH over a carrier where a main frequency point selected by a wireless network controller for the multi-carrier terminal is located; and the base station scheduling the multi-carrier terminal through the E-AGCH.

When scheduling the multi-carrier terminal, the base station selects some or all carriers supported by the multi-carrier terminal for scheduling, and sends authorization information to the multi-carrier terminal through the E-AGCH over the scheduled carrier; and after receiving the authorization information sent by the base station, the multi-carrier terminal sends the SNPL value of the scheduled carrier and SNPL values of other carriers measured by the present terminal to the base station over the scheduled carrier through the E-PUCH.

As shown in FIG. 1, it specifically includes the following steps:

in step 110, when the UE is configured with the multi-carrier HSUPA, the UE reports its multi-carrier ability to the radio network controller (RNC);

specifically, the UE reports that it has the multi-carrier ability to the RNC in an RRC connection establishment request;

in step 120, the RNC selects the main frequency point for the UE, determines the carrier (main carrier) where the main frequency point is located as the sending carrier of the E-RUCCH, and informs the UE of the information of the selected main carrier;

in step 130, when the UE needs to access to the mobile network in the uplink, the UE uses the E-RUCCH to send the uplink access request to the base station over the carrier where the main frequency point selected by the RNC is located;

in step 140, after the base station receives the E-RUCCH sent by the UE, it schedules the UE through the E-AGCH;

the base station selects some (one or more) or all carriers supported by the multi-carrier terminal for scheduling, and sends the authorization information to the multi-carrier terminal through the E-AGCH over the scheduled carrier; and the authorization information includes the information such as the transmission power and the configuration of the physical resources specifically, etc., that is, the information such as the physical code channel and transmission power, etc., used by the UE in one RDI (including one or more TTIs);

when scheduling for the first time, the base station configures the authorization information by using the default value of the serving and neighbor cell path loss (SNPL). The default value of the SNPL can be the SNPL value of the main carrier, or other preset SNPL values;

in the present embodiment, the E-AGCH frame structure can follow the frame structure of the single carrier E-AGCH. One E-AGCH only authorizes the resource of one carrier in one TTI;

in step 150, after the UE receives its first scheduling by the base station, the UE sends the SNPL of the scheduled carrier and the SNPL of all other carriers measured by the present terminal to the base station over the carrier scheduled by the base station through the E-PUCH;

the frequency point measured by the multi-carrier terminal is a frequency point supported by the present terminal in the frequency points of the neighbor cells.

Preferably, the UE can place the SNPL value of the scheduled carrier and the SNPL values of other carriers into scheduling information (SI) and send to the base station, wherein, the SI includes the SNPL value of the scheduled carrier and SNPL information of other carriers, and the SNPL information of other carriers includes: a carrier index used for indicating the carriers, and the SNPL values of the carriers indicated in the carrier index; the specific operation refers to the description in embodiment 2. In other embodiments, other SI formats can be adopted, or the base station can be notified of the SNPL values of each carrier of the UE by other ways.

When the base station schedules the multi-carrier terminal again after scheduling for the first time, the base station configures the authorization information by using the SNPL value of the scheduled carrier and the SNPL values of other carriers measured by the terminal sent by the multi-carrier terminal.

In the present embodiment, the RNC appoints the main carrier as the carrier which sends the E-RUCCH for the UE, to enable the UE working at multiple carrier frequencies at the same time to access to the network.

Embodiment 2 the present embodiment describes how the UE sends the SNPL value of each carrier to the base station, including:

the multi-carrier terminal sending the SNPL value of the scheduled carrier and the SNPL values of other carriers measured by the present multi-carrier terminal to the base station through the E-PUCH over the carrier scheduled by the base station at regular intervals, wherein, the SNPL of the scheduled carrier and the SNPL values of other carriers are placed in the SI of the E-PUCH.

Preferably, in the SI, the number of bits taken up by the SNPL of the scheduled carrier is [1, 5], and preferably is 5; the SNPL information of other carriers takes up no more than 30 bits, wherein, the number of bits taken up by the carrier index is [1, 5], and preferably is 5; and the number of bits taken up by the SNPL value of each carrier indicated in the carrier index is [1, 5], and preferably is 5.

Preferably, the UE can carry the present SNPL value of each carrier through the SI format as shown in table 1.

TABLE 1

| SI format | | | | | | | | |
|---|---|---|---|---|---|---|---|---|
| SNPL (5 bits) | UPH (5 bits) | TEBS (5 bits) | HLBS (4 bits) | HLID (4 bits) | SNPL bitmap (5 bits) | SNPL2 (5 bits) | ... | SNPLn (5 bits) |

In the table:

the SNPL, UPH (the power surplus of the UE), TEBS (Total E-DCH Buffer Status, the occupation condition of the buffer of the logic channel mapped onto the E-DCH), HLBS (the state of the logic channel buffer with the highest priority) and HUD (the ID number of the logic channel buffer with the highest priority) are the channel quality parameters of the scheduled carrier;

the SNPL bitmap is the carrier index used for indicating the carriers, and the sequence of the carriers indicated in the bitmap is the same with and corresponding one-by-one to the sequence of the carriers where the CNPL carried in the SI format belongs; every bit in the bitmap correspondingly represents whether one carrier has an SNPL to report, for example, it represents that the SNPL of the corresponding carrier is reported when the bit of the bitmap is 1;

the SNPL2~SNPLn are the reported SNPLs of other carriers, there is an instruction for each carrier in the SNPL bitmap, n is the carrier number, and the range of the total number of the carriers is [2, 6].

The SI format in the above-mentioned table 1 is only an example, and the maximum length for the SI format is of 53 bits; the above-mentioned SI format is adjustable according to the number of carriers.

Preferably, the UE can update the SNPL value of every carrier constantly through measurement, which is realized by a timer T-SI maintained therein specifically. Each time when the T-SI timing is reached, the UE reports the SI to the base station through the MAC-i (the identification of the MAC layer) in the E-PUCH channel, and the format of the SI is shown as in the table 1. The UE restarts the timer T-SI when receiving the scheduling (receiving the authorization information) over any carrier.

Through the channel configuration of the present embodiment, the UE can send the SNPL of other carriers except the scheduled carrier to the base station, to enable the base station to configure the related parameters such as the transmission power, code rate, etc., according to the SNPL of every carrier.

Embodiment 3 when in the multi-carrier HSUPA, after the UE accesses the wireless network randomly, the base station sets the code rate according to the SNPL of every carrier of the UE, and the UE and the base station perform the data transmission; the UE and the base station transmit the hybrid automatic retransmission (HARQ) information on the E-HICH during the service data interaction process.

Specifically, the E-HICH and the E-PUCH can be located in the same carrier, or, the E-HICH and the E-PUCH are located in different carriers; and the corresponding relation of the carriers of the E-HICH and the E-PUCH can be configured through the RRC signaling by the network side. The carrier where the E-PUCH is located is the carrier scheduled by the base station on the UE.

Because the UE only sends the service data over the carrier scheduled by the base station, and sends the E-PUCH and the HARQ information over the scheduled carrier, if the E-HICH and the E-PUCH are located in the same carrier, the HARQ information sent on the E-HICH is the HARQ data of the carrier, that is, the HARQ information is only used for acknowledgement and retransmission of the service data sent over the carrier. If the E-HICH and the E-PUCH are located in different carriers, the HARQ information sent on the E-HICH is the HARQ data of other carriers, that is, the HARQ information sent over a certain carrier is used for acknowledgement and retransmission of the service data sent over other carriers, for example, an idle carrier can be selected to intensively perform the acknowledgement and retransmission of the service data over other carriers.

Embodiment 4 the present embodiment describes a multi-carrier scheduling system for realizing the method in embodiment 1, including an access request transmission module and a scheduling module, wherein, the access request transmission module is located in the multi-carrier terminal, and used to: when the multi-carrier terminal accesses a network in an uplink, send an uplink access request to a base station through the E-RUCCH over a carrier where a main frequency point selected by a wireless network controller for the multi-carrier terminal is located; and the scheduling module is located in the base station, and configured to schedule the multi-carrier terminal through the E-AGCH.

Preferably, the scheduling module is configured to schedule the multi-carrier terminal through the E-AGCH by means of: when scheduling the multi-carrier terminal, selecting some or all carriers supported by the multi-carrier terminal for scheduling, and sending authorization information to the multi-carrier terminal through the E-AGCH over the scheduled carrier; and the system further includes a signal quality information transmission module located in the terminal, configured to: after receiving the authorization information sent by the base station, send the SNPL value of the scheduled carrier and SNPL values of other carriers measured by the present terminal to the base station over the scheduled carrier through the E-PUCH.

Preferably, the system further includes an authorization information configuration module located in the base station, configured to: configure the authorization information by using a default value of the SNPL when the base station schedules the multi-carrier terminal for a first time; and configure the authorization information by using the SNPL value of the scheduled carrier and the SNPL values of other carriers measured by the multi-carrier terminal sent by the multi-carrier terminal when the base station schedules the multi-carrier terminal again after scheduling for the first time.

Preferably, the signal quality information transmission module is configured to send the SNPL value of the scheduled carrier and the SNPL values of other carriers measured by the present terminal to the base station over the scheduled carrier through the E-PUCH by means of: placing the SNPL value of the scheduled carrier and the SNPL values of other carriers into the SI of the E-PUCH, wherein, the SI comprises the SNPL value of the scheduled carrier and SNPL information of other carriers, and the SNPL information of other carriers comprises: a carrier index used for indicating the carriers, and the SNPL values of the carriers indicated in the carrier index.

Preferably, the system further includes an HARQ information transmission module located in the terminal, configured to: in a service data interaction process with the base station, transmit the HARQ information on the E-HICH, wherein, the-HICH and the E-PUCH locates in the same carrier.

Embodiment 5 the present embodiment describes a multi-carrier terminal signal quality information transmission system for realizing the method of the embodiment 2, including a measurement module and a transmission module, wherein:

the measurement module is configured to measure a serving and neighbor cell path loss (SNPL) value of a scheduled carrier and SNPL values of other carriers; and the transmission module is configured to send the SNPL value of the scheduled carrier and the SNPL values of other carriers measured by the measurement module to the base station through the E-PUCH over a carrier scheduled by the base station at regular intervals, wherein, the SNPL of the scheduled carrier and the SNPL values of other carriers are placed in scheduling information (SI) of the E-PUCH.

The measurement for each carrier SNPL can be realized with the related art.

Preferably, the SI includes the SNPL value of the scheduled carrier and SNPL information of other carriers, and the SNPL information of other carriers includes: a carrier index used for indicating the carriers, and SNPL values of the carriers indicated in the carrier index.

Preferably, in the SI, the SNPL of the scheduled carrier takes up 5 bits, the SNPL information of other carriers takes up no more than 30 bits, the carrier index in the SNPL information of other carriers takes up 5 bits, and the SNPL value of each carrier indicated in the carrier index takes up 5 bits.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Obviously, the present document further can have a variety of other embodiments. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

With the scheduling method and system of the above-mentioned embodiments, the multi-carrier terminal is enabled to access the mobile network smoothly. With the method and system for transmitting signal quality information of the above-mentioned embodiments, the network side is enabled to know the signal quality information of every carrier of the multi-carrier terminal, such that the network side sets the transmission parameters of the related data for the multi-carrier terminal, thus performing the data transmission.

What we claim is:

1. A multi-carrier terminal scheduling method, comprising:
   a wireless network controller selecting a main frequency point for a multi-carrier terminal, and determining a carrier where the main frequency point is located as a sending carrier of E-Enhanced Dedicated Channel Random Access Uplink Control Channel (E-RUCCH);
   when accessing a network in an uplink, the multi-carrier terminal sending an uplink access request to a base station through the E-RUCCH over the sending carrier of the E-RUCCH; and
   the base station scheduling the multi-carrier terminal through an Enhanced Dedicated Channel Absolute Grant Channel (E-AGCH);
   wherein the step of the base station scheduling the multi-carrier terminal through the E-AGCH comprises:
   when the base station schedules the multi-carrier terminal, selecting some or all carriers supported by the multi-carrier terminal for scheduling, and sending authorization information to the multi-carrier terminal through the E-AGCH over the scheduled carrier; and
   after the multi-carrier terminal receives the authorization information sent by the base station, sending a serving and neighbor cell path loss (SNPL) value of the scheduled carrier and SNPL values of other carriers measured by the present terminal to the base station over the scheduled carrier through an enhanced dedicated channel physical uplink channel (E-PUCH);
   wherein, when the base station schedules the multi-carrier terminal for a first time, the authorization information is configured by the base station using a default value of the SNPL; and
   when the base station schedules the multi-carrier terminal again after scheduling for the first time, the authorization information is configured by the base station using the measured SNPL value of the scheduled carrier and the SNPL values of other carriers sent by the multi-carrier terminal.

2. The method according to claim 1, wherein,
   the step of sending the SNPL value of the scheduled carrier and the SNPL values of other carriers measured by the present terminal to the base station over the scheduled carrier through the E-PUCH comprises:
   the multi-carrier terminal placing the measured SNPL value of the scheduled carrier and the SNPL values of other carriers into scheduling information (SI) of the E-PUCH, wherein, the SI comprises the SNPL value of the scheduled carrier and SNPL information of other carriers, and the SNPL information of other carriers comprises: a carrier index used for indicating the carriers, and the SNPL values of the carriers indicated in the carrier index.

3. The method according to claim 2, wherein,
   in the SI, the SNPL of the scheduled carrier takes up 5 bits, the SNPL information of other carriers takes up no more than 30 bits, the carrier index in the SNPL information of other carriers takes up 5 bits, and the SNPL value of each carrier indicated in the carrier index takes up 5 bits.

4. The method according to claim 1, wherein,
   after the base station schedules the multi-carrier terminal through the E-AGCH, the method further comprises:
   in a service data interaction process of the base station and the multi-carrier terminal, transmitting a hybrid automatic retransmission (HARQ) information on an enhanced dedicated channel hybrid automatic retransmission acknowledgement indication channel (E-HICH), wherein, the-HICH and the E-PUCH locates in a same carrier.

5. A multi-carrier terminal scheduling system, comprising an access request transmission module and a scheduling module, wherein,
   the access request transmission module is located in the multi-carrier terminal, and configured to: when the multi-carrier terminal accesses a network in an uplink, send an uplink access request to a base station through an Enhanced Dedicated Channel Random Access Uplink Control Channel (E-RUCCH) over a carrier where a main frequency point selected by a wireless network controller for the multi-carrier terminal is located; and
   the scheduling module is located in the base station, and configured to schedule the multi-carrier terminal through an Enhanced Dedicated Channel Absolute Grant Channel (E-AGCH);

the multi-carrier terminal scheduling system further comprises the wireless network controller, configured to select the main frequency point for the multi-carrier terminal, and determine a carrier where the main frequency point is located as a sending carrier of the E-RUCCH;

wherein, the scheduling module is configured to schedule the multi-carrier terminal through the E-AGCH by means of: when scheduling the multi-carrier terminal, selecting some or all carriers supported by the mufti-carrier terminal for scheduling, and sending authorization information to the multi-carrier terminal through the E-AGCH over the scheduled carrier; and the system further comprises a signal quality information transmission module located in the terminal, configured to: after receiving the authorization information sent by the base station, send a serving and neighbor cell path loss (SNPL) value of the scheduled carrier and SNPL values of other carriers measured by the present terminal to the base station over the scheduled carrier through an enhanced dedicated channel physical uplink channel (E-PUCH);

wherein, the system further comprises an authorization information configuration module located in the base station, configured to: configure the authorization information by using a default value of the SNPL when the base station schedules the multi-carrier terminal for a first time; and configure the authorization information by using the SNPL value of the scheduled carrier and the SNPL values of other carriers measured by the multi-carrier terminal sent by the multi-carrier terminal when the base station schedules the multi-carrier terminal again after scheduling for the first time.

6. The system according to claim 5, wherein, the signal quality information transmission module is configured to send the SNPL value of the scheduled carrier and the SNPL values of other carriers measured by the present terminal to the base station over the scheduled carrier through the E-PUCH by means of:

placing the SNPL value of the scheduled carrier and the SNPL values of other carriers into scheduling information (SI) of the E-PUCH, wherein, the SI comprises the SNPL value of the scheduled carrier and SNPL information of other carriers, and the SNPL information of other carriers comprises: a carrier index used for indicating the carriers, and the SNPL values of the carriers indicated in the carrier index.

7. The system according to claim 5, wherein, the system further comprises a hybrid automatic retransmission (HARQ) information transmission module located in the terminal, configured to: in a service data interaction process with the base station, transmit the HARQ information on an enhanced dedicated channel hybrid automatic retransmission acknowledgement indication channel (E-HICH), wherein, the-HICH and the E-PUCH locates in a same carrier.

* * * * *